United States Patent [19]

Cheng et al.

[11] 4,394,667

[45] Jul. 19, 1983

[54] RADIAL ACCESS DRIVE FOR AN OPTICAL DISK RECORDER

[75] Inventors: David Cheng, San Jose; Stephen T. Chai, Rancho Palos Verdes, both of Calif.

[73] Assignee: Xerox Corporation, Stamford, Conn.

[21] Appl. No.: 362,361

[22] Filed: Mar. 26, 1982

[51] Int. Cl.³ ................... G06K 15/02; G01D 15/32
[52] U.S. Cl. ................................. 346/137; 346/76 L
[58] Field of Search .......... 369/100; 346/76 L, 135.1, 346/137, 49; 354/15

[56] References Cited

U.S. PATENT DOCUMENTS

| | | | |
|---|---|---|---|
| 3,423,524 | 1/1969 | Bradford | 346/137 X |
| 3,438,050 | 4/1969 | Aschenbrenner et al. | 346/49 |
| 4,038,663 | 7/1977 | Day et al. | 346/76 L X |

*Primary Examiner*—Donald A. Griffin
*Attorney, Agent, or Firm*—Leonard Zalman

[57] ABSTRACT

An optical disk recorder in which the optical disk, the drive spindle and the disk drive motor are moved or pivoted in an arcuate path relative to stationary laser optics. When moved in such an arcuate path, the optical disk, spindle and drive motor have a lessened movement of inertia (compared to linear movement thereof) which permits relatively fast accessing of an optical disk without a large drive motor. The accessing system can be naturally statically balanced by placing the spindle and the drive motor or opposite sides of the pivot point.

4 Claims, 4 Drawing Figures

RADIAL ACCESS DRIVE FOR AN OPTICAL DISK RECORDER

BACKGROUND OF THE INVENTION

Digital optical disks are now being seriously considered as potential alternatives to magnetic tape and disk memories. It has been found that optical disks offer a substantially greater data storage capacity than commercially available magnetic tape or disc memories of similar size.

As is well known, digital optical disks are configured to have a plurality of tracks. A continuous, spirally configured track format is well suited for applications involving long, continuous runs of digital data, while a format providing a plurality of concentric tracks may sometimes be better for applications requiring random access to selected memory locations. By synchronizing movement of the laser optics with rotation of the optical disk, desired tracks and track regions of the optical disk can be accessed for writing or reading purposed. Conventionally, movement of the laser optics is achieved by traversing a carriage containing the laser optics along a linear path across the tracks, as taught by U.S. Pat. Nos. 3,969,344 and 3,720,924, or by moving the optical disc along a linear path in conjunction with stationary laser optics, as taught by U.S. Pat. No. 3,438,050. Since optical disks and laser optics are not particularly light weight (compared with magnetic disk heads), and thus, have relatively large inertia, the access times for optical disks are usually slow. Conventionally, faster access times for optical disks are achieved by utilization of large drive motors which are expensive. Also, movement of the laser optics may produce vibration of the laser optics. Accordingly, there is a need for apparatus that can achieve fast accessing of an optical disk without utilizing a large drive motor, and that is substantially free of laser optics vibration.

SUMMARY OF THE INVENTION

In accordance with the invention, the optical disk, the drive spindle and the disk drive motor are moved or pivoted in an arcuate path relative to stationary laser optics. When moved in such an arcuate path, the optical disk, spindle and drive motor have a lessened movement of inertia (compared to linear movement thereof) which permits relatively fast accessing of an optical disk without a large drive motor. In addition, by having stationary laser optics, those optics are substantially free of vibration. The accessing system can be naturally statically balanced by placing the spindle and the drive motor on opposite sides of the pivot point.

DESCRIPTION OF THE PREFERRED EMBODIMENTS

Figure 1:
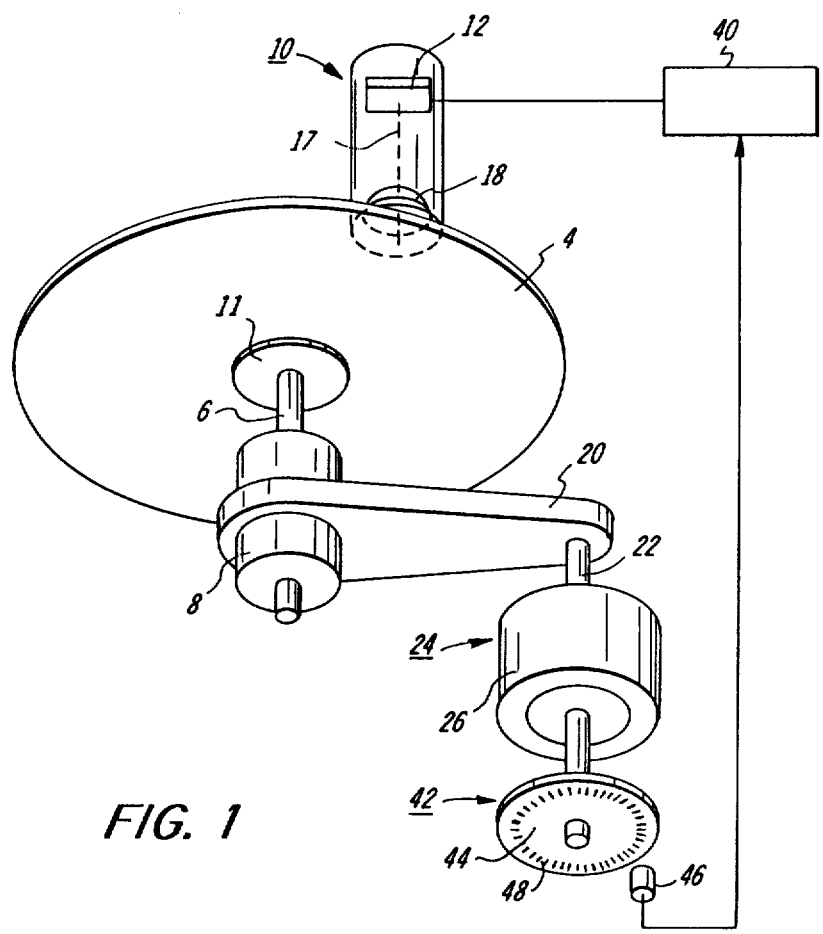
FIG. 1 is a perspective view of an optical disk recorder having fast access capabilities.

Referring now to FIG. 1 of the drawings, there is shown a perspective view of an optical disk accessing apparatus in accordance with the invention. The apparatus includes an optical disk supported in a conventional manner on the rotor spindle 6 of a suitable drive means, such as an electric motor 8. Typically, during operation, motor 8 causes disk 4 to rotate about the axis of spindle 6 at an essentially constant angular velocity relative to stationary, conventional laser optics 10.

The laser optics 10 include a diode laser 12 which receives a pulse modulated drive current to produce a modulated, coherent write light beam 14. The modulated write beam is directed to an objective lens 18 which focuses the modulated write beam on the disk 4. In lieu of a diode laser, the laser optics could include a gaseous laser and an associated acousto-optic or other appropriate modulator.

Disk 4 is a threshold sensitive recording medium, for example, an ablatable tellurium based, reflective film which is coated on an optically transparent substrate, such as glass or plastic. In that event, the output power of laser 12 and the depth of modulation of the write beam are selected so that the intensity of the write beam, as measured at the surface of disk 4, swings above and below a predetermined ablation threshold level for the film as a function of the modulation. Consequently, the write beam burns small holes (not shown) in the film or otherwise changes the physical or chemical structure of the film to represent the data which is to be recorded. When reading recorded data, the laser 12 is driven in the continuous wave (CW) regime at an output level below the ablation threshold level of the film.

Optical disk 4, spindle 6 and drive motor 8 are supported by a rigid arm 20 which extends from the rotor 22 of another suitable drive means, such as a torque motor 24. As illustrated, one end of arm 20 is immoveably coupled to the casing of motor 8 and the other end of arm 20 is immoveably coupled to the rotor 22 of motor 24. The arm couplings are achieved in any conventional manner such as by a frictional fit, it only being necessary that no rotational slippage occur at the arm couplings. Stator 26 of motor 24 is fixed with respect to the laser optics 10.

The storage of data is under the control of a processor 40 which provides signals to laser 12 in synchronization with the movement of arm 20 by means of signals derived from a position transducer 42 comprised, for example, of an inductosyn disk 44 and a magnetic pick-up 46. Disk 44 includes a peripheral track with a series regularly spaced magnetic spots or lines 48 which may be detected by magnetic pick-up 46, the resultant signal from which is transmitted to processor 40.

Movement of the optical disk 4 into a desired position relative to the fixed laser optics 10 results from rotation of rotor 22 in response to energization of stator 26. Such rotor rotation causes the arm 20 to pivot about the axis of rotor 22, resulting in the movement of disk 4, spindle 6 and motor 8. Due to the pivoting action, the disk 4 moves along an arcuate path relative to the laser optic which extends between extreme positions adjacent the edge and center of disk 4 whereby the entire spinning disk surface can be scanned.

Figure 3A:
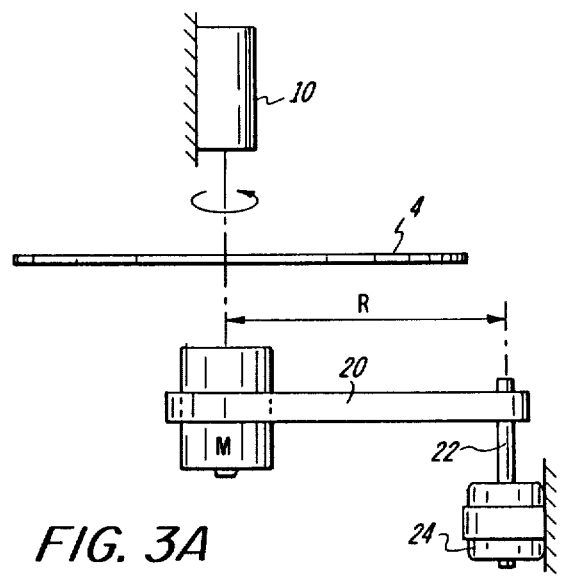
FIG. 3a is a vertical cross-sectional view of the recorder.
Figure 3B:
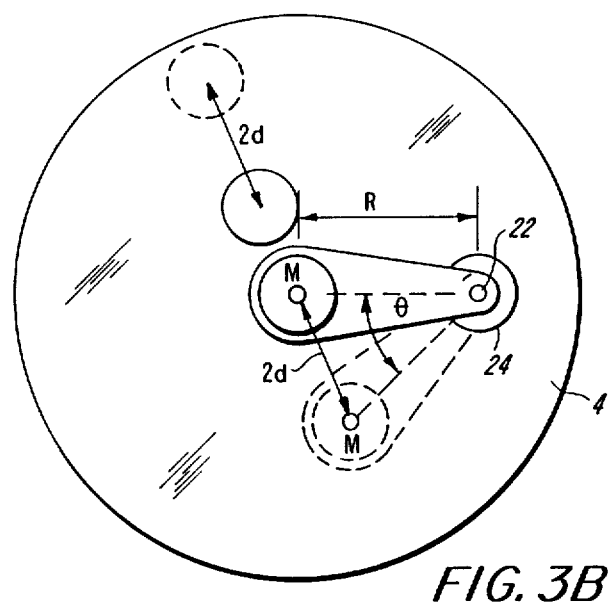
FIG. 3b is a horizontal cross-sectional view of the recorder taken thru the recorder disc.

Referring to FIGS. 3a and 3b, for the laser optics 10 to scan the entire spinning surface of disk 4, the torque motor 24, such as brushless torque motor TQ25-2 available from AEROFLEX Corporation, must rotate the mass M (where M is the combined mass of disk 4, spindle 6 and drive motor 8) through a scanning angle $\theta$. The inertia of mass M about the torque motor center line is $J_M = MR^2 = W/g\ R^2$ where $W$ = weight of mass M which, for example, can be 12 oz. where disk 4 (12" diameter 1 mm thick PMMA)=2 oz., motor 8 (Pittman 7214B-152 SmCo magnet)=6 oz., spindle 6 and hub (2.5" diameter, 0.25" thick Al)=2 oz., and other components, such as, rotor 22 and arm 20, have an assumed weight equal to 20% of the combined weight of the disk, motor, spindle and hub, in this example 2 oz. Assuming that R=2.0", the total inertia that the torque motor 24 must drive is $J_{total}=J_M+J_{torque\ motor\ 24}=0.12+0.08=0.2$ in. oz. sec.$^2$. Using $J_{total}$, the torque motor 24 acceleration ($\alpha$) can be computed $\alpha=T/J_{total}=400$ in.oz./0.2 in.oz. sec.$^2=2000$ rad/sec$^2$ where T equals maximum torque of motor 24. The torque motor 24 scan angle $\theta$ is $\theta=2\ (\sin^{-1}d/R)=2(\sin^{-1}\frac{1}{2})=2(30°)=60°\approx 1$ rad. where $d=\frac{1}{2}$ of a two inch data band. For time optimal scanning, the torque motor provides acceleration to maximum velocity during half of the scan time and deceleration to stop during the other half of the scan time. Accordingly, $Acc=\theta/2=\frac{1}{2}\alpha_a t_a^2$ and $Dec=\theta/2=\frac{1}{2}\alpha_d t_d^2$. Since $\theta=\frac{1}{2}\alpha_a t_a^2+\frac{1}{2}\alpha_d t_d^2$, the minimum access time for a 2" swing is $t_{min.total}=\sqrt{\theta/\alpha_a}+\sqrt{\theta/\alpha_d}=2\sqrt{\theta/\alpha}=2\sqrt{1/2000}\approx 45$ m sec.

Since the only interest is moving the mass M through a linear distance of 2d of data band, the linear distance the torque motor mass m is moved is proportional to the distance from the center line, which is small. However, in the linear movement approaches of the prior art, the mass M, the linear movement motor mass m and associated guides must all move the entire distance 2d. Accordingly, the novel apparatus of the present invention is more efficient than the prior art because in the novel apparatus the motor mass m is not moved the entire distance 2d.

In addition to requiring less drive power to move disk 4, the disclosed accessing apparatus utilizes stationary laser optics which permits the laser optics to be substantially free of vibration. In keeping with accepted practices, the objective lens 18 can be moved back and forth relative to disk 4 by a servo controlled voice coil (not shown) so that fine adjustment of beam focus at disk 4 can be achieved.

Figure 2:
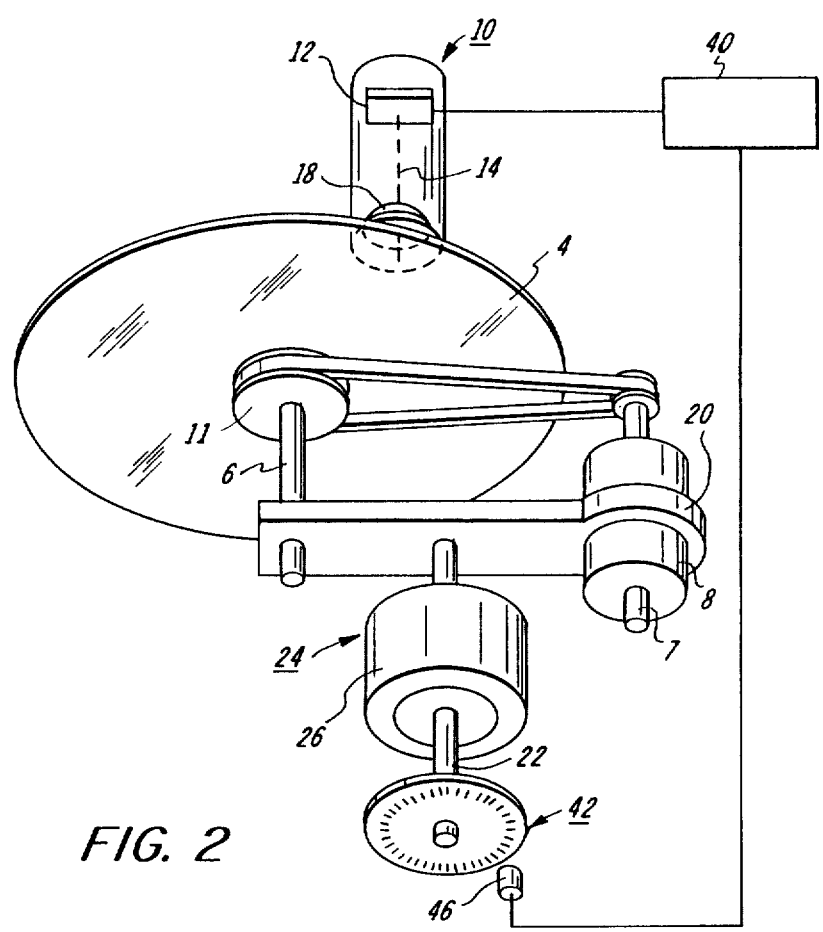
FIG. 2 is a perspective view of an optical disk recorder having fast access capabilities and static balance.

To avoid any balancing problems attendant with the apparatus of FIG. 1, the apparatus of FIG. 2 can be utilized. In the latter apparatus, the spindle 6 and the drive motor 8 for the spindle 6 are placed at opposite ends of arm 20, that is, on opposite sides of the pivot, with the arm coupled to both the spindle 6 and the drive motor 8. A belt 9 coupled between the rotor 7 of the drive motor 8 and the spindle hub 11 would provide for rotation of the disk 4.

We claim:

1. In a data recorder system including optical means for providing an information modulated light beam, a member including a data recording surface sensitive to said light beam, and first means for causing rotation of said data recording surface, characterized in that said optical means are held in a stationary position, and second means for moving said data recording surface along an arcuate path relative to said optical means.

2. The recorder system of claim 1 wherein said second means includes a motor having a rotor and a rigid member coupled to said rotor and to said first means.

3. The recorder system of claim 2 wherein said first means is located at one end of said rigid member.

4. The recorder system of claim 2 wherein a portion of said first means is located at one end of said rigid member and other portion of said first means is located at the other end of said rigid member whereby said system is dynamically balanced.

* * * * *